United States Patent
Labiste

(10) Patent No.: US 11,863,108 B2
(45) Date of Patent: Jan. 2, 2024

(54) DEVICE FOR DETERMINING THE ANGULAR POSITION OF A ROTOR OF A ROTATING ELECTRIC MACHINE

(71) Applicant: VALEO EQUIPEMENTS ELECTRIQUES MOTEUR, Creteil (FR)

(72) Inventor: Laurent Labiste, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 7 days.

(21) Appl. No.: 17/787,492

(22) PCT Filed: Nov. 9, 2020

(86) PCT No.: PCT/EP2020/081447
§ 371 (c)(1),
(2) Date: Jun. 20, 2022

(87) PCT Pub. No.: WO2021/121770
PCT Pub. Date: Jun. 24, 2021

(65) Prior Publication Data
US 2023/0039095 A1    Feb. 9, 2023

(30) Foreign Application Priority Data
Dec. 20, 2019    (FR) ...................... 1915288

(51) Int. Cl.
*H02P 6/17* (2016.01)
*H02P 6/08* (2016.01)
*B60L 3/12* (2006.01)

(52) U.S. Cl.
CPC .................. *H02P 6/17* (2016.02); *B60L 3/12* (2013.01); *H02P 6/08* (2013.01); *B60L 2240/421* (2013.01)

(58) Field of Classification Search
CPC ...... H02P 6/17; H02P 6/08; B60L 3/12; B60L 2240/421
(Continued)

(56) References Cited

U.S. PATENT DOCUMENTS 5,565,752 A * 10/1996 Jansen .................... H02P 6/183
                                                          310/201
6,243,167 B1    6/2001 Bouamra
(Continued)

FOREIGN PATENT DOCUMENTS

EP    2 124 327 A2    11/2009

OTHER PUBLICATIONS

Sasaki et al. (CN 102135554 A), "Sagnac Interferometer-type Fibre-optic Current Sensor" Date Published Jul. 27, 2011 (Year: 2011).*

(Continued)

*Primary Examiner* — Jorge L Carrasquillo
(74) *Attorney, Agent, or Firm* — Oblon, McClelland, Maier & Neustadt, L.L.P.

(57) ABSTRACT

Device for determining the angular position of a rotor of a rotary electric machine on the basis of signals delivered by a plurality of position sensors, including a circuit producing a control loop for estimating position of the rotor, delivering at output a signal representative of the position, and a circuit for dynamic normalization by the amplitude of the first harmonic of each signal originating from a position sensor. The circuit receives as input each signal originating from a position sensor, and at least one image of the signal representative of the position of the rotor and is configured to demodulate each signal by the image of the signal, determine, at the end of this demodulation, amplitude of the first harmonic of this signal originating from a position sensor, (Continued)

Figure 1:
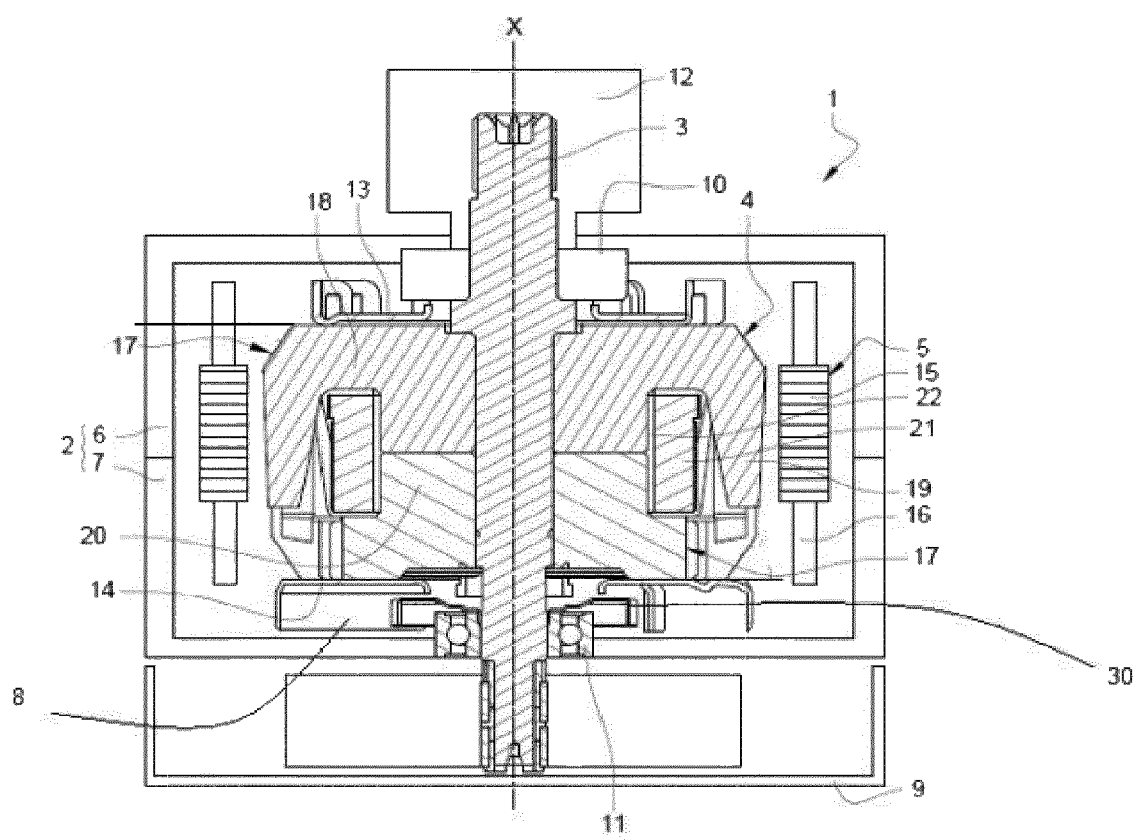

and normalize each signal by dividing it by the amplitude of the first harmonic of the previously determined signal.

20 Claims, 3 Drawing Sheets

(58) Field of Classification Search
USPC .......................................................... 318/799
See application file for complete search history.

(56) References Cited

U.S. PATENT DOCUMENTS

| | | |
|---|---|---|
| 8,131,482 B2 * | 3/2012 | Turner .................... H02P 23/14 702/33 |
| 2009/0292501 A1 | 11/2009 | Bernard et al. |
| 2012/0160036 A1 | 6/2012 | Henry et al. |
| 2013/0213143 A1 | 8/2013 | Henry et al. |
| 2014/0114589 A1 | 4/2014 | Henry et al. |
| 2014/0116155 A1 | 5/2014 | Henry et al. |
| 2014/0116156 A1 | 5/2014 | Henry et al. |
| 2014/0129156 A1 | 5/2014 | Henry et al. |

OTHER PUBLICATIONS

Oblizayeck (CN 102407879 B) "Of The Steering Wheel Vibration Electric Power Steering System Is Reduced In A Method, System And Device" Date Published Jul. 29, 2015 (Year: 2015).*
International Search Report dated Feb. 3, 2021 in PCT/EP2020/081447 filed on Nov. 9, 2020, 2 pages.

* cited by examiner

DEVICE FOR DETERMINING THE ANGULAR POSITION OF A ROTOR OF A ROTATING ELECTRIC MACHINE

The present invention relates to a device for determining the angular position of a rotor of a rotary electric machine as well as an assembly comprising such a determining device and such a rotary electric machine.

The electric machine is, for example, an alternator or a starter-alternator powered by a nominal voltage of 12 V or 48 V, or even more.

This electric machine can be integrated into a hybrid or purely electric vehicle, for example a motor vehicle.

In order to control this electric machine it is necessary to know the angular position of the rotor of the machine. To do this, it is known practice, in the case of a three-phase synchronous machine, to use a plurality of Hall effect sensors, the signals of which are processed, after a mathematical transformation such as a Clarke or Concordia transform, by a circuit producing a control loop for estimating the position of the rotor. This circuit delivers at output a signal representative of this position of the rotor. This measurement can then be, for example, used to control the inverter/rectifier interposed between the stator of this electric machine and the electrical energy storage unit of the onboard network of the vehicle, which is in particular a battery.

The precision of the position obtained at the output of the circuit producing the control loop depends in large part on the precision of the signals which are delivered by the sensors. From one sensor to another, the signal can have a different first harmonic amplitude and this amplitude gap, from one sensor to another, causes harmonics to appear at the aforementioned circuit producing the control loop.

In order to overcome the problem of the amplitude gap between sensors, it is known practice to assign, to the coefficients of the matrix used to apply the aforementioned mathematical transformation, a value correcting the aforementioned parameters. As such coefficients are fixed once and for all on the basis of the behavior for one operating point of the electric machine, the correction is not robust and it is not suitable for the whole operating range of the electric machine. This correction is, for example, no longer optimal when the temperature of the machine changes.

There is a need to overcome the aforementioned drawbacks, by robustly improving the quality of the signals which are received by the circuit producing a control loop for estimating the position of the rotor.

The invention aims to satisfy this need and it does so, according to one of its aspects, using a device for determining the angular position of a rotor of a rotary electric machine on the basis of signals delivered by a plurality of position sensors, the device comprising:

a circuit producing a control loop for estimating the position of the rotor, delivering at output a signal representative of the position of the rotor, and a circuit for dynamic normalization by the amplitude of the first harmonic of each signal originating from a position sensor, this dynamic normalization circuit receiving at input:
each signal originating from a position sensor, and
at least one image of the signal representative of the position of the rotor, this dynamic normalization circuit being configured to:
demodulate each signal originating from a position sensor by the image of the signal representative of the position of the rotor, determine, at the end of this demodulation, the amplitude of the first harmonic of this signal originating from a position sensor, and normalize each signal originating from a position sensor by dividing it by the amplitude of the first harmonic of said previously determined signal.

According to the invention, each signal originating from a position sensor is thus dynamically normalized, so that the circuit producing the control loop for estimating the position of the rotor processes signals originating from the position sensors, the amplitude of which with respect to the first harmonic remains constant over time. Consequently, the harmonics generated in the circuit producing the control loop are reduced, or even eliminated, thereby improving the precision of the signal representative of the position of the rotor. Any other control using this signal representative of the position of the rotor is consequently then improved.

Demodulation of a signal originating from a position sensor can be performed synchronously.

The signal representative of the position of the rotor is, for example, an angle value with respect to a reference position. The image of the signal representative of the position of the rotor is, for example, a linear combination of the cosine and the sine of this angle measured with respect to the reference position.

During demodulation, the same image of the signal representative of the position of the rotor can be applied to each signal originating from a sensor. In the event that more than two sensors are used to determine the position of the rotor, for example three sensors, for example three Hall effect sensors, the image of the representative signal can be proportional to the cosine of the aforementioned angle, or to the sine of this angle, or be a linear combination of the cosine of this angle and the sine of this angle.

The dynamic normalization circuit can comprise a low-pass filter making it possible to isolate, from the result of the demodulation performed, the amplitude of the first harmonic of the signal originating from a position sensor. It is thus not necessary to provide a bandpass filter, with a variable cutoff frequency, applied upstream of demodulation.

The low-pass filter can be 2nd order.

The low-pass filter can have a cutoff frequency of between 0.3 Hz and 50 Hz for a magnetic target borne by the rotor with eight pairs of poles. This cutoff frequency can be fixed and make it possible to extract the amplitude of the first harmonic of the signal to which demodulation was applied for the whole operating range of the electric machine. Normalization of each signal originating from a position sensor by the dynamic normalization circuit can then be performed on an ongoing basis by dividing said signal by the amplitude of the first harmonic determined using the aforementioned demodulation.

As a variant, this normalization is performed by dividing said signal by the amplitude of the first harmonic determined using the aforementioned demodulation only for a certain operating range of the electric machine, for example beyond a minimum rotational speed at the rotor. Below this minimum rotational speed, which is, for example, 100, 200, 300, 400, 500, 600 or 700 rpm, normalization can be performed by dividing the signal by a predefined first harmonic amplitude value, which is, for example, the last amplitude value determined for this first harmonic or another value, such as a value calculated for a given operating point of the rotary electric machine. This predefined first harmonic amplitude value is not necessarily constant. Such normalization on the basis of a speed threshold makes it possible to avoid having to use too selective a low-pass filter.

The low-pass filter can be configured to have a variable cutoff frequency depending on the speed of the rotor. Such a configuration is suitable when there is a desire to improve the precision of the amplitude of the first harmonic which it is the aim to determine. The low-pass filter can then have:
- a first operating range with a cutoff frequency which is above a first frequency threshold, for example of the order of 2 Hz for a magnetic target borne by the rotor with eight pairs of poles when the speed of the rotor is below a first speed threshold, for example of the order of 2000 rpm, and
- a second operating range with a cutoff frequency which is below a second frequency threshold which is below the first frequency threshold, this second frequency threshold being, for example, of the order of 0.5 Hz, when the speed of the rotor is above the first speed threshold and still with the aforementioned magnetic target.

In a different variant from what has just been described, the low-pass filter can remain in the second operating range even when there is a drop below the first speed threshold subsequently to a first operating range.

The existence of the first operating range for the low-pass filter makes it possible to quickly extract an amplitude value for the first harmonic of the signal originating from the sensor. At the start of this first operating range, the predefined first harmonic amplitude value can be used at the input of the low-pass filter.

As has been seen, throughout the preceding text, the determining device can comprise means for deactivating the dynamic normalization circuit depending on a predefined condition, for example depending on the rotational speed of the rotor of the electric machine.

The dynamic normalization circuit can, for each signal originating from a sensor, apply demodulation which is particular to this signal and process the output of this demodulation by means of a specific low-pass filter. Each of these low-pass filters can be identical. Moreover, from one position sensor to another, the predefined first harmonic amplitude value can be different.

Throughout the preceding text, the device can be configured to apply, to each normalized signal at the output of the dynamic normalization circuit, a mathematical transformation for modeling a system, in particular a three-phase system, as a two-phase system. This transformation uses, for example, a Clarke or Concordia matrix.

The dynamic normalization circuit is arranged upstream of the circuit producing a control loop for estimating the position of the rotor.

The mathematical transformation for modeling the system can be applied by a block arranged at the output of the dynamic normalization circuit and at the input of the circuit producing the control loop for estimating the position of the rotor.

Another subject of the invention, according to another of its aspects, is an assembly comprising:
- a rotary electric machine for propelling a hybrid or electric vehicle, and
- a device for controlling this electric machine, comprising a determining device as defined above.

The rotary electric machine is, for example, a synchronous machine, for example a three-phase synchronous machine or a synchronous machine the stator electrical winding of which defines a double three-phase system. The stator electrical winding is, for example, formed by wires or by conducting bars connected to one another.

Throughout the preceding text, the rotor can be a claw-pole rotor. This rotor then comprises a first and a second pole wheel which are nested, the first pole wheel defining a series of claws of trapezoidal overall shape, each claw extending axially in the direction of the second pole wheel, the second pole wheel defining a series of claws of trapezoidal overall shape, each claw extending axially in the direction of the first pole wheel. A permanent magnet can be received between two consecutive claws, circumferentially speaking, for the rotor. As a variant, the rotor can be different from a claw-pole rotor, comprising, for example, a stack of laminations or being a cage rotor.

Throughout the preceding text, the rotor can comprise any number of pairs of poles, for example six or eight pairs of poles.

The rotary electric machine can have a nominal electric power of 4 kW, 8 kW, 15 kW, 25 kW or more.

This rotary electric machine can be electrically powered by an electrical energy storage unit via an inverter/rectifier of the assembly, this inverter/rectifier making it possible, according to whether the electric machine is operating as a motor or as a generator, to charge an onboard network of the vehicle or to be electrically powered by this network.

The nominal voltage of the electrical energy storage unit can be 12 V or 48 V or have another value, for example another value above 300 V.

The rotary electric machine can further comprise a pulley or any other means of connection to the rest of the powertrain of the vehicle. The electric machine is, for example, connected, in particular via a belt, to the crankshaft of the combustion engine of the vehicle. As a variant, the electric machine is connected at other locations in the powertrain, for example at the input of the gearbox, from the point of view of the torque passing toward the wheels of the vehicle, at the output of the gearbox, from the point of view of the torque passing toward the wheels of the vehicle, at the gearbox, from the point of view of the torque passing toward the wheels of the vehicle, or even on the front axle assembly or the rear axle assembly of this powertrain.

The rotary electric machine is not necessarily a synchronous machine, it being possible for it to be an asynchronous machine.

Another subject of the invention, according to another of its aspects, is a method for determining the angular position of a rotor of a rotary electric machine on the basis of signals delivered by a plurality of position sensors, wherein a determining device as previously defined is used.

All or some of what has been previously said also applies to this other aspect of the invention.

This determining method is, for example, integrated into a method for controlling the electric machine, wherein the angular position of the rotor determined as above is used to control the engine torque and/or the current of the electrical energy storage unit.

Figure 2:
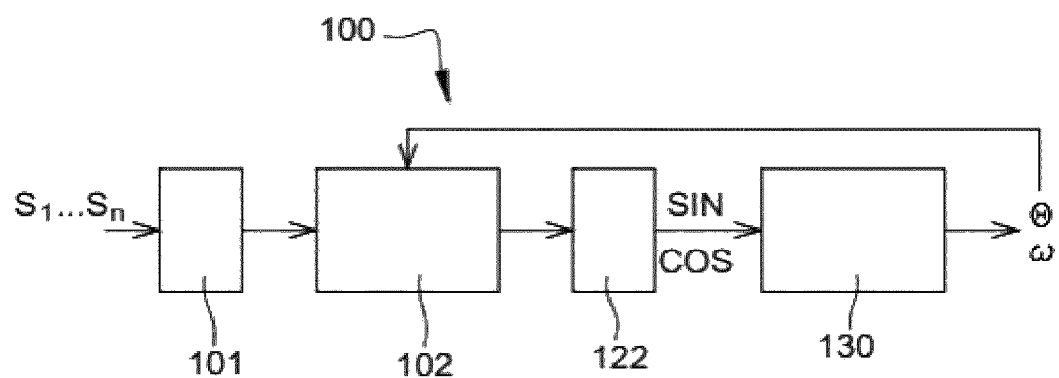
Figure 3:
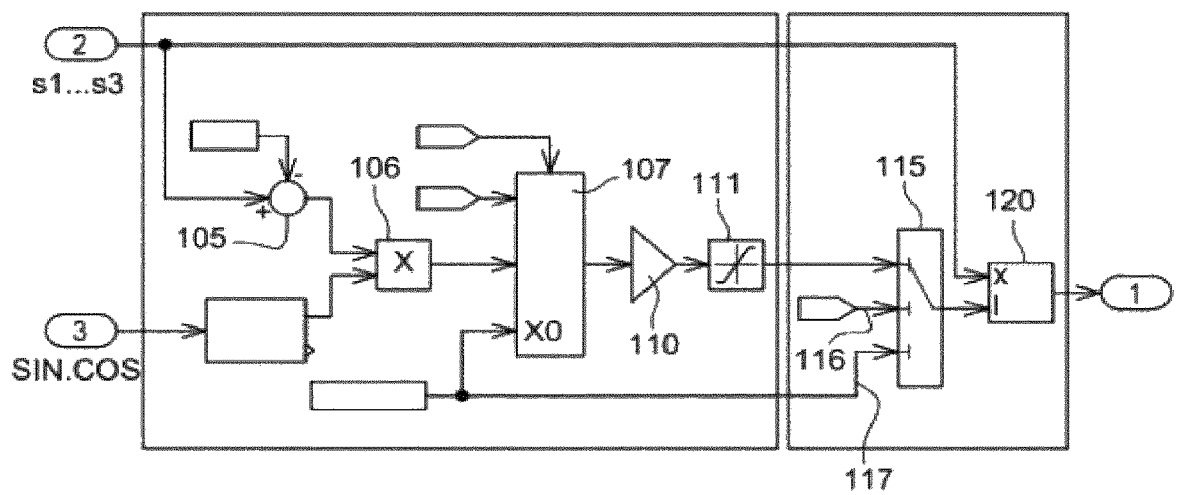
Figure 4:
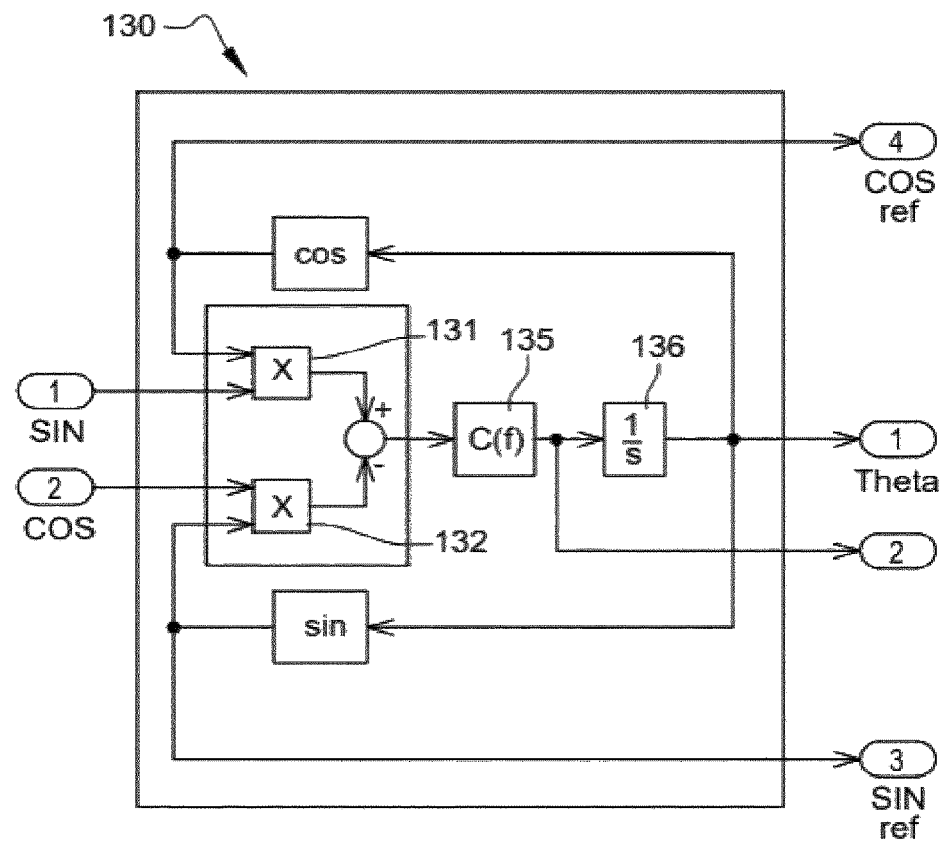
Figure 5:
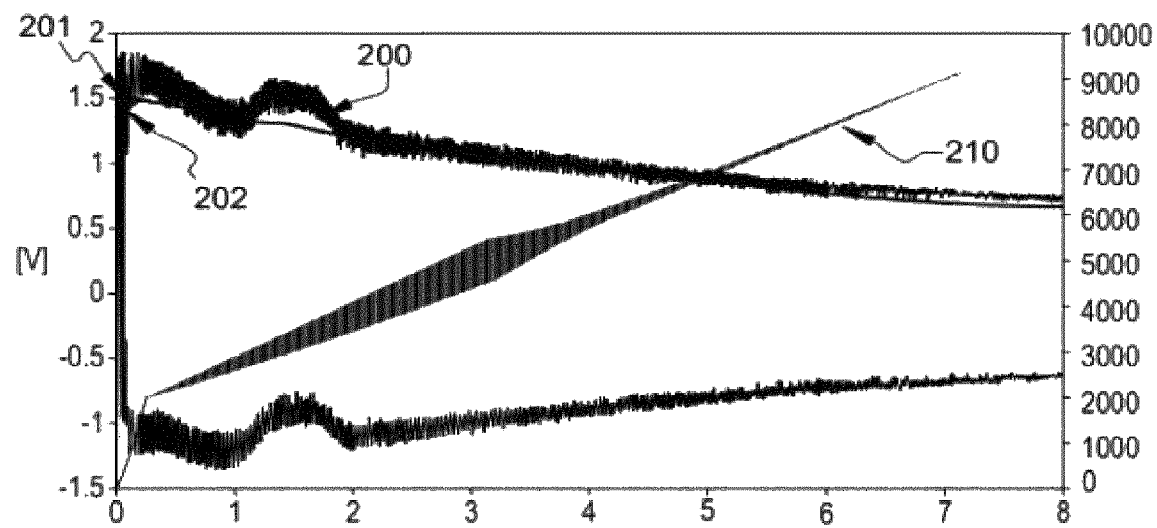

The invention can be better understood on reading the following description of one non-limiting exemplary implementation thereof and on studying the appended drawing, in which:

FIG. 1 schematically shows, in axial cross section, an exemplary rotary electric machine to which the invention can be applied, FIG. 2 schematically shows the device for determining the position of the rotor of the machine according to one non-limiting exemplary implementation of the invention, FIG. 3 schematically shows the dynamic normalization circuit of FIG. 2, FIG. 4 schematically shows the circuit producing the control loop for estimating the position of the rotor of FIG. 2, and FIG. 5 shows a plurality of variations in the amplitude of the signal originating from a position sensor depending on the same speed setpoint applied to the rotor of the electric machine.

FIG. 1 shows a polyphase rotary electric machine 1, in particular for a motor vehicle, to which the invention can be applied.

This rotary electric machine can form an alternator or a starter-alternator of the vehicle. This rotary electric machine can be powered, via a power electronics component 9 comprising an inverter/rectifier, by a battery, the nominal voltage of which is 12 V or 48 V or has a value above 300 V, for example.

The rotary electric machine 1 comprises a casing 2. Inside this casing 2, it further comprises a shaft 3, a rotor 4 which rotates as one with the shaft 3 and a stator 5 surrounding the rotor 4. The rotational movement of the rotor 4 takes place about an axis X. In this example, the casing 2 comprises a front bearing 6 and a rear bearing 7 which are assembled together. These bearings 6, 7 are hollow in form and each bear, centrally, a respective ball bearing 10, 11 for the rotational mounting of the shaft 3.

A pulley 12 is, in the example under consideration, fixed to a front end of the shaft 3, at the front bearing 6, for example using a nut bearing on the bottom of the cavity of this pulley. This pulley 12 makes it possible to transmit the rotational movement to the shaft 3 and it can be connected, via a belt, to the crankshaft of the combustion engine of the vehicle.

The rear end of the shaft 3 bears, in this instance, slip rings belonging to a commutator and connected by wire connections to the winding. Brushes belonging to a brush holder 8 are arranged so as to rub against the slip rings.

The front bearing 6 and the rear bearing 7 can further comprise substantially lateral openings for the passage of air in order to make it possible for the rotary electric machine to be cooled by the circulation of air generated by the rotation of a front fan 13 on the front dorsal face of the rotor 4, that is to say at the front bearing 6, and of a rear fan 14 on the rear dorsal face of the rotor, that is to say at the rear bearing 7.

In this exemplary embodiment, the stator 5 comprises a body 15 in the form of a stack of laminations which is provided with notches, for example of the semi-closed or open type, equipped with notch insulator for the mounting of the polyphase electrical winding of the stator. Each phase comprises a winding 16 passing through the notches of the body 15 and forming, with all the phases, a front bundle and a rear bundle on either side of the body of the stator. The windings 16 are, for example, obtained from a continuous wire covered with enamel or from conductive elements in the form of a bar such as pins connected to one another. The electric winding of the stator is, for example, three-phase, then implementing a star or delta configuration, the outputs of which are connected to the power electronics component 9.

The rotor 4 of FIG. 1 is a claw-pole rotor. It comprises two pole wheels 17. The first pole wheel 17 faces the power electronics component 9, while the second pole wheel 17 faces the pulley 12.

Each of the pole wheels 17 comprises a bottom 18 extending radially on either side of the axis X, the wheel defining a series of claws 19 of trapezoidal overall shape. Each claw of a pole wheel 17 extends axially in the direction of the other pole wheel from a base arranged on the radially outer periphery of the bottom 18.

The rotor 4 further comprises, between the radially inner portions 20 and the claws 19, a coil wound on a coil insulator 22.

The rotor 4 can also comprise permanent magnets (which are not shown) interposed between two adjacent claws 19 at the outer periphery of the rotor. As a variant, the rotor 4 can be devoid of such permanent magnets.

There can be any number of pairs of poles which is defined by the rotor 4, for example six or eight.

The machine also comprises sensors for measuring the position of the rotor 4, for example three Hall effect sensors, grouped together in the same housing made from plastic. These sensors are, for example, positioned at the rear bearing 7 of the machine and they interact with a magnetic target 30 which rotates as one with the rotor. In the example which is going to be described, this magnetic target 30 defines eight pairs of poles.

The measurements delivered by these sensors are used by the circuit 100 for determining the angular position of the rotor 4, which is now going to be described with reference to FIGS. 2 to 4.

In a known manner, the circuit 100 comprises a block 101 performing discretization of the signals s1 to s3 acquired by each position sensor.

At the output of this block 101, the various signals originating from the sensors and which have been discretized attack a dynamic normalization circuit 102 which also receives at input an image of the signal representative of the position of the rotor. This image is in this instance a linear combination of the cosine and the sine of the angle θ measured with respect to a reference position of this rotor, the time derivative of this angle corresponding to the rotational speed of this rotor 4.

In the example under consideration, each signal originating from a sensor then discretized and which is received at the input of the dynamic normalization circuit 102 is first of all corrected in 105 by subtracting the zero error. The signal thus corrected then undergoes, in 106, synchronous and coherent demodulation by the linear combination of the cosine and the sine of the angle of the rotor.

The signal $x_i$ resulting from this demodulation then enters a low-pass filter 107 which has, in the example under consideration, a variable cutoff frequency. In a first operating range, for example for a speed of the rotor of between 0 rpm and 2000 rpm, the cutoff frequency of this filter 107 is between 2 Hz and 50 Hz in the example under consideration. In a second operating range, for example for a speed of the rotor above 2000 rpm, the cutoff frequency of the filter is of the order of 0.5 Hz in the example under consideration.

The low-pass filter 107 has another input corresponding to a predefined amplitude value $x0_i$ for the first harmonic of the signal received at the input of the dynamic normalization circuit 102. This value $x0_i$ can be used as an input datum by the low-pass filter 107 at the start of the first operating range.

At the output of the low-pass filter 107, the value of the first harmonic of the signal received at the input of the dynamic normalization circuit 102 can be extracted, from the demodulated signal, for each of the aforementioned operating modes.

Phase-shift compensation and saturation are respectively applied to this amplitude of the first harmonic of the signal received at the input of the dynamic normalization circuit 102 by respective blocks 110 and 111, and the resulting signal is received at the input of a selector 115. This selector also receives a control signal via an input 116, as well as, via another input 117, the predefined value of the amplitude of the first harmonic also received at the input of the filter 107.

According to the circumstances, there can, via the control signal at the input 116, be imposed at the output of the selector 115:
- the first amplitude value for the signal received at the input of the circuit 102 resulting from the demodulation operation, or
- the predefined first amplitude value $x0_i$ for this first harmonic of said signal.

This value at the output of the selector 115 is then used to normalize the signal received at the input of the circuit 102, a block 120 dividing this signal received at the input of the circuit 102 by the value of the amplitude of the first harmonic for this signal present at the output of the selector 115.

What has just been described above is applied in parallel to each signal originating from a sensor for sensing the position of the rotor of the electric machine.

The signals thus obtained at the output of the circuit 102 are received at the input of a block 122 performing a mathematical transformation for modeling the system, which is three-phase in the example, as a two-phase system. This transformation uses, for example, a Clarke or Concordia matrix. Other transformations can be used when the number of position sensors is different from 3.

The signals at the output of this block 122 are received at the input of a circuit 130 producing a control loop for controlling the position of the rotor 4, delivering at output a signal representative of the position of the rotor 4, which is the aforementioned angle θ. This circuit 130 modulates, via a block 131, the sine signal at the output of the block 122 by the cosine of the angle θ, and this circuit 130 also modulates, via a block 132, the cosine signal at the output of the block 122 by the sine of the angle θ. The difference between the signals at the output of the blocks 131 and 132 is received at the input of a corrector 135. The output of the corrector 135 delivers the rotational speed of the rotor 4, which delivers another output of the circuit 130, and this rotational speed enters an integrator 136 of the circuit 130, in order to obtain the angle θ.

The speed and angle values thus obtained can be used to control the rotary electric machine 1.

FIG. 5 shows, on the same graph, a plurality of responses originating from a position sensor during a speed hike 210 for the rotor 4 moving from 0 to 10,000 rpm.

The curve 200 represents the signal delivered by the sensor according to the prior art in reaction to this speed hike, upstream of the determining device 100.

The curve 201 represents the actual value of this amplitude of the first harmonic in reaction to this speed hike.

The curve 202 represents the amplitude of the first harmonic of this signal, as determined using the circuit 102 described above, in reaction to this speed hike.

It can be observed that, while the curve 200 is neither quick nor stable nor precise, the curve 202 follows the curve 201 from the low speeds despite interference such as the offset and the other harmonics.

The invention is not limited to the example which has just been described.

The invention claimed is:

1. A device for determining the angular position of a rotor of a rotary electric machine on the basis of signals delivered by a plurality of position sensors, the device comprising:
   - a circuit producing a control loop for estimating the position of the rotor, delivering at output a signal representative of the position of the rotor, and
   - a circuit for dynamic normalization by the amplitude of the first harmonic of each signal originating from a position sensor, this dynamic normalization circuit receiving at input:
     - each signal originating from a position sensor, and
     - at least one image of the signal representative of the position of the rotor, this image being in particular a linear combination of the cosine and the sine of an angle measured with respect to the reference position of the rotor,
   - this dynamic normalization circuit being configured to:
     - demodulate each signal originating from a position sensor by the image of the signal representative of the position of the rotor,
     - determine, at the end of this demodulation, the amplitude of the first harmonic of this signal originating from a position sensor, and
     - normalize each signal originating from a position sensor by dividing it by the amplitude of the first harmonic of said previously determined signal.

2. The device as claimed in claim 1, wherein demodulation of a signal originating from a position sensor is performed synchronously.

3. The device as claimed in claim 1, wherein the dynamic normalization circuit performs normalization by dividing the signal originating from the position sensor by the amplitude of the first harmonic determined using demodulation only for a certain operating range of the electric machine.

4. The device as claimed in claim 3, wherein the dynamic normalization circuit performs dynamic normalization outside this operating range of the machine by dividing the signal originating from the position sensor by a predefined first harmonic amplitude value.

5. The device as claimed in claim 1, wherein the dynamic normalization circuit comprises a low-pass filter making it possible to isolate, from the result of the demodulation performed, the amplitude of the first harmonic of the signal originating from a position sensor.

6. The device as claimed in claim 5, wherein the low-pass filter is configured to have a variable cutoff frequency depending on the speed of the rotor.

7. The device as claimed in claim 1, which is configured to apply, to each normalized signal at the output of the dynamic normalization circuit, a mathematical transformation for modeling a system, in particular a three-phase system, as a two-phase system, the mathematical transformation for modeling the system being in particular applied by a block arranged at the output of the dynamic normalization circuit and at the input of the circuit producing the control loop for estimating the position of the rotor.

8. An assembly comprising:
   - a rotary electric machine for propelling a hybrid or electric vehicle, and
   - a device for controlling this electric machine, comprising a determining device as claimed in claim 1.

9. A method for determining the angular position of a rotor of a rotary electric machine on the basis of signals delivered by a plurality of position sensors, wherein a determining device as claimed in claim 1 is used.

10. The device as claimed in claim 2, wherein the dynamic normalization circuit comprises a low-pass filter making it possible to isolate, from the result of the demodulation performed, the amplitude of the first harmonic of the signal originating from a position sensor.

11. The device as claimed in claim 2, which is configured to apply, to each normalized signal at the output of the dynamic normalization circuit, a mathematical transformation for modeling a system, in particular a three-phase system, as a two-phase system, the mathematical transformation for modeling the system being in particular applied by a block arranged at the output of the dynamic normalization circuit and at the input of the circuit producing the control loop for estimating the position of the rotor.

12. An assembly comprising:
   a rotary electric machine for propelling a hybrid or electric vehicle, and
   a device for controlling this electric machine, comprising a determining device as claimed in claim 2.

13. A method for determining the angular position of a rotor of a rotary electric machine on the basis of signals delivered by a plurality of position sensors, wherein a determining device as claimed in claim 2 is used.

14. The device as claimed in claim 3, wherein the dynamic normalization circuit comprises a low-pass filter making it possible to isolate, from the result of the demodulation performed, the amplitude of the first harmonic of the signal originating from a position sensor.

15. The device as claimed in claim 3, which is configured to apply, to each normalized signal at the output of the dynamic normalization circuit, a mathematical transformation for modeling a system, in particular a three-phase system, as a two-phase system, the mathematical transformation for modeling the system being in particular applied by a block arranged at the output of the dynamic normalization circuit and at the input of the circuit producing the control loop for estimating the position of the rotor.

16. An assembly comprising:
   a rotary electric machine for propelling a hybrid or electric vehicle, and
   a device for controlling this electric machine, comprising a determining device as claimed in claim 3.

17. A method for determining the angular position of a rotor of a rotary electric machine on the basis of signals delivered by a plurality of position sensors, wherein a determining device as claimed in claim 3 is used.

18. The device as claimed in claim 4, wherein the dynamic normalization circuit comprises a low-pass filter making it possible to isolate, from the result of the demodulation performed, the amplitude of the first harmonic of the signal originating from a position sensor.

19. The device as claimed in claim 4, which is configured to apply, to each normalized signal at the output of the dynamic normalization circuit, a mathematical transformation for modeling a system, in particular a three-phase system, as a two-phase system, the mathematical transformation for modeling the system being in particular applied by a block arranged at the output of the dynamic normalization circuit and at the input of the circuit producing the control loop for estimating the position of the rotor.

20. An assembly comprising:
   a rotary electric machine for propelling a hybrid or electric vehicle, and
   a device for controlling this electric machine, comprising a determining device as claimed in claim 4.

* * * * *